United States Patent
Nishikawa (10) Patent No.: US 10,164,247 B2
(45) Date of Patent: Dec. 25, 2018

(54) SULFUR-CARBON COMPOSITE, NONAQUEOUS ELECTROLYTE BATTERY INCLUDING ELECTRODE CONTAINING SULFUR-CARBON COMPOSITE, AND METHOD FOR PRODUCING SULFUR-CARBON COMPOSITE

(71) Applicant: GS Yuasa International Ltd., Kyoto-shi, Kyoto (JP)

(72) Inventor: Heisuke Nishikawa, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 15/526,206

(22) PCT Filed: Nov. 6, 2015

(86) PCT No.: PCT/JP2015/005571
§ 371 (c)(1),
(2) Date: May 11, 2017

(87) PCT Pub. No.: WO2016/075916
PCT Pub. Date: May 19, 2016

(65) Prior Publication Data
US 2017/0317340 A1 Nov. 2, 2017

(30) Foreign Application Priority Data
Nov. 13, 2014 (JP) .................. 2014-231053

(51) Int. Cl.
H01M 4/36 (2006.01)
H01M 4/587 (2010.01)
(Continued)

(52) U.S. Cl.
CPC ............. *H01M 4/364* (2013.01); *C01B 32/05* (2017.08); *H01M 4/0471* (2013.01);
(Continued)

(58) Field of Classification Search
None
See application file for complete search history.

(56) References Cited

U.S. PATENT DOCUMENTS 6,692,870 B2 2/2004 Fujitani
7,361,431 B2 4/2008 Lee
(Continued)

FOREIGN PATENT DOCUMENTS

JP 10172614 A2 6/1998
JP 2001307727 A2 11/2001
(Continued)

OTHER PUBLICATIONS

International Search Report dated Dec. 8, 2015 filed in PCT/JP2015/005571.
(Continued)

*Primary Examiner* — Katie L Hammer
(74) *Attorney, Agent, or Firm* — Rankin, Hill & Clark LLP (57) ABSTRACT

A sulfur-carbon composite in which sulfur is combined with porous carbon is provided. In the sulfur-carbon composite, a mass loss ratio X at 500° C. in thermal mass analysis and a mass ratio Y of sulfur/(sulfur+carbon) in an observation visual field at a magnification of 1000 in SEM-EDS quantitative analysis satisfy the relationship of $|X/Y-1|\leq 0.12$, and porous carbon has a mean pore diameter of 1 to 6 nm, and a specific surface area of 2000 $m^2 g^{-1}$ or more and 3000 $m^2 g^{-1}$ or less.

9 Claims, 5 Drawing Sheets (51) Int. Cl.

| | |
|---|---|
| *H01M 4/38* | (2006.01) |
| *H01M 10/0525* | (2010.01) |
| *C01B 17/00* | (2006.01) |
| *C01B 31/26* | (2006.01) |
| *H01M 4/62* | (2006.01) |
| *C01B 32/05* | (2017.01) |
| *H01M 4/04* | (2006.01) |
| *H01M 4/133* | (2010.01) |
| *H01M 4/136* | (2010.01) |
| *H01M 4/1393* | (2010.01) |
| *H01M 4/1397* | (2010.01) |
| *H01M 10/052* | (2010.01) |

(52) U.S. Cl.
CPC ........... *H01M 4/133* (2013.01); *H01M 4/136* (2013.01); *H01M 4/1393* (2013.01); *H01M 4/1397* (2013.01); *H01M 4/38* (2013.01); *H01M 4/587* (2013.01); *H01M 4/62* (2013.01); *H01M 4/622* (2013.01); *H01M 10/052* (2013.01); *H01M 10/0525* (2013.01); *C01P 2006/12* (2013.01); *C01P 2006/16* (2013.01); *H01M 2220/20* (2013.01); *Y02T 10/7011* (2013.01)

(56) References Cited

U.S. PATENT DOCUMENTS

| | | |
|---|---|---|
| 8,858,840 B2 | 10/2014 | Chung |
| 8,900,484 B2 | 12/2014 | Barchasz |
| 2007/0287060 A1 | 12/2007 | Ogihara |
| 2009/0311604 A1* | 12/2009 | Nazar ............... H01M 4/364 429/231.8 |
| 2011/0052998 A1* | 3/2011 | Liang ............... H01M 4/136 429/300 |
| 2011/0059361 A1* | 3/2011 | Wilkening ........... H01M 4/136 429/218.1 |
| 2011/0206992 A1* | 8/2011 | Campbell ............... H01M 4/80 429/235 |
| 2013/0181676 A1* | 7/2013 | Kourtakis ............. H01M 4/133 320/128 |

FOREIGN PATENT DOCUMENTS

| | | |
|---|---|---|
| JP | 2003197196 A2 | 7/2003 |
| JP | 2006092885 A2 | 4/2006 |
| JP | 2006164779 A2 | 6/2006 |
| JP | 2010095390 A2 | 4/2010 |
| JP | 2010146908 A1 | 7/2010 |
| JP | 2011518743 | 6/2011 |
| JP | 2012156100 A2 | 8/2012 |
| JP | 2012533862 | 12/2012 |
| JP | 2013118191 A1 | 6/2013 |
| JP | 2013137981 A2 | 7/2013 |
| JP | 2013143297 A2 | 7/2013 |
| JP | 2013254620 A2 | 12/2013 |
| JP | 2013258080 A2 | 12/2013 |
| WO | 2009114314 A2 | 9/2009 |

OTHER PUBLICATIONS

W. Zhang et al. "A Li+-F-conductive microporous carbon-sulfur composite for Li-S batteries", Sep. 29, 2012, Electrochimica Acta, vol .87, 2013, pp. 497-502.

* cited by examiner

| Element | (keV) Compound | Mass% Mass% |
|---|---|---|
| C | 0.277 | 40.16 |
| S | 2.307 | 59.84 |
| Total | | 100.00 |

SULFUR-CARBON COMPOSITE, NONAQUEOUS ELECTROLYTE BATTERY INCLUDING ELECTRODE CONTAINING SULFUR-CARBON COMPOSITE, AND METHOD FOR PRODUCING SULFUR-CARBON COMPOSITE

TECHNICAL FIELD

The present invention relates to a sulfur-carbon composite, a nonaqueous electrolyte battery including an electrode containing the sulfur-carbon composite, and a method for producing the sulfur-carbon composite.

BACKGROUND ART

A lithium secondary battery that is a nonaqueous electrolyte battery is a device having a high energy density and a high power density. Heretofore, lithium transition metal composite oxides such as $LiCoO_2$, $LiNiO_2$ and $LiMn_2O_4$ have been put into practical use as positive electrode materials for lithium secondary batteries. These lithium transition metal composite oxides have a capacity of about 150 $mAhg^{-1}$ per mass.

Sulfur has a high theoretical capacity of 1675 $mAhg^{-1}$ per mass. Sulfur has been examined as a positive electrode material exhibiting a capacity that is 10 times or more of the capacity of a conventional material. However, sulfur has not been put into practical use yet because it has high reactivity with an electrolyte solution, and high resistance.

Attempts have been made heretofore to combine sulfur with an electrically conductive material.

Non-Patent Document 1 describes that sulfur is mixed with porous carbon into which lithium ions can be inserted, and the mixture is heat-treated at 400° C. for 6 hours to prepare an electrode material composed of a sulfur-carbon composite in which sulfur is carried on porous carbon. Non-Patent Document 1 also describes a lithium-sulfur secondary battery obtained using the electrode material. According to this document, the capacity of sulfur on a mass basis is 720 $mAhg^{-1}$ after 100 cycles of charge-discharge.

Patent Document 1 describes that sulfur is mixed with a porous carbon matrix having nanopores and nanochannels with a mean diameter of 1 to 999 nm and having a pore volume of 10 to 99% by volume, and the mixture is heat-treated at 120 to 180° C. to prepare a porous matrix in which sulfur is adsorbed to a part of the nanopores and nanochannels. According to this document, sulfur constitutes 70% by mass of the material.

Patent Document 2 describes a mesoporous carbon composite material to be used in an electrode of a nonaqueous electrolyte-type secondary battery, the composite material containing sulfur in an amount of 5% or more of the total weight in mesopores of mesoporous carbon with a pore mean diameter of 1 to 40 nm.

PRIOR ART DOCUMENTS

Non-Patent Document

Non-Patent Document 1: Electrochimica Acta, Vol. 87, p. 497-502(2013)

PATENT DOCUMENTS

Patent Document 1: JP 2013-118191 A
Patent Document 2: JP 2010-95390 A

SUMMARY OF THE INVENTION

Problems to be Solved by the Invention

In a conventional composite of sulfur and porous carbon, a sufficient sulfur utilization rate is not obtained. Studies have not been sufficiently conducted on a method for producing a composite for improving the sulfur utilization rate.

An object of the present invention is to provide a sulfur-carbon composite having a high sulfur utilization rate, a nonaqueous electrolyte battery including an electrode containing the sulfur-carbon composite, and a method for producing the sulfur-carbon composite having a high sulfur utilization rate.

Means for Solving the Problems

An aspect of the present invention has the following configurations for achieving the above-described object.

(1) A sulfur-carbon composite in which sulfur is combined with porous carbon, wherein a mass loss ratio X over a temperature range from room temperature to 500° C. in thermal mass analysis and a mass ratio Y of sulfur/(sulfur+carbon) in an observation visual field at a magnification of 1000 in SEM-EDS quantitative analysis satisfy the relationship of $|X/Y-1| \leq 0.12$.

(2) A method for producing a sulfur-carbon composite, the method including a step of heating, in a closed container, a mixture obtained by mixing sulfur with porous carbon having a specific surface area of 2000 $m^2g^{-1}$ or more and 3000 $m^2g^{-1}$ or less, and a peak half-value width of 1.0 to 2.5 nm in a log differential pore volume distribution to form a sulfur-carbon composite, the heating step including: a first step of heating the mixture for 5 hours or more at a temperature at which sulfur is melted; and a second step of heating the mixture at a temperature at which sulfur is vaporized, after the first step.

(3) A method for producing a sulfur-carbon composite, the method including a step of heating, in a closed container, a mixture obtained by mixing sulfur with porous carbon having a specific surface area of 2000 $m^2g^{-1}$ or more and 3000 $m^2g^{-1}$ or less, and a peak half-value width of 1.0 to 2.5 nm in a log differential pore volume distribution to form a sulfur-carbon composite, the heating step including heating the mixture at a temperature rise rate of 0.5° C./minute or less to a temperature at which sulfur is melted, and to a temperature at which sulfur is vaporized.

Advantages of the Invention

According to one aspect of the present invention, there can be provided a sulfur-carbon composite having a high sulfur utilization rate, and a nonaqueous electrolyte battery including an electrode containing the sulfur-carbon composite.

MODE FOR CARRYING OUT THE INVENTION

The content of sulfur in a sulfur-carbon composite is preferably 50% by mass or more in carrying out an embodiment of the present invention. Since the theoretical capacity of sulfur is 1675 mAhg$^{-1}$, the sulfur-carbon composite can be made to have a discharge capacity of 800 mAhg$^{-1}$ or more per mass by setting the content of sulfur in the sulfur-carbon composite to 50% by mass or more.

The pore volume of porous carbon is preferably 0.9 cm$^3$g$^{-1}$ or more. Since the density of sulfur is 2.0 gcm$^{-3}$, and the volume change ratio in discharge with Li inserted into sulfur (lithiation) is 1.8, the volume per 1 g of sulfur in lithiation is 1 g/2.0 gcm$^{-3}$×1.8=0.9 cm$^3$. Therefore, it can be understood that for ensuring that the content of sulfur in the composite is 50% by mass or more, the pore volume per 1 g of porous carbon is required to be 0.9 cm$^3$ or more. Thus, the pore volume of the porous carbon is 0.9 cm$^3$g$^{-1}$ or more, so that sulfur can be sufficiently held in pores in the sulfur-carbon composite.

Preferably, the porous carbon in the embodiment of the present invention has a specific surface area of 2000 m$^2$g$^{-1}$ or more and 3000 m$^2$g$^{-1}$ or less. When the specific surface area of the porous carbon is in the above-mentioned range, carbon and sulfur are properly in contact with each other, so that electric conductivity is improved, and therefore an electrode having a high sulfur utilization rate can be obtained.

Since sulfur has high resistance, it is preferred that the sulfur be in contact with the electrically conductive porous carbon at a wide interface for proper movement of electrons. Accordingly, it is preferred that as the porous carbon, one having pores with a mean pore diameter of 1 to 6 nm be selected. When sulfur is carried in the pores, the particle size of the carried sulfur can be set within the range of 6 nm or less, so that a sulfur-carbon composite having excellent ion conductivity and electron conductivity and a high sulfur utilization rate can be obtained. When the mean pore diameter is 1 nm or more, permeability to an electrolyte solution can be sufficiently improved.

Preferably, the porous carbon in the embodiment of the present invention has a peak half-value width of 1.0 nm to 2.5 nm in a log differential pore volume distribution. By using porous carbon having a peak half-value width of 1.0 nm to 2.5 nm in a log differential pore volume distribution, the particle sizes of sulfur particles in the sulfur-carbon composite are equalized, so that the sulfur utilization rate can be improved. Preferably, the porous carbon has a single peak in a log differential pore volume distribution. When the porous carbon has a single peak in a long differential volume distribution, the particle sizes of sulfur particles in pores are equalized, so that the sulfur utilization rate can be improved.

Porous carbon having a specific surface area of 2000 m$^2$g$^{-1}$ or more and 3000 m$^2$g$^{-1}$ or less, a mean pore diameter of 1 to 6 nm, and a peak half-value width of 1.0 to 2.5 nm in a log differential pore volume distribution may be prepared by a template method in which the porous carbon is synthesized using a layered clay mineral, porous glass, silica gel, silica sol, zeolite, mesoporous silica or the like as a template (see "Carbon", No. 199 (200) 176-186), or a composite of surfactant micelles and a polymer serving as a carbon source may be heated to simultaneously perform removal of the surfactant and carbonization of the polymer (see Chem. Commun. (2005) 2125-2127). As in the later-described example, carbon may be isolated by extracting MgO from carbon-coated MgO generated by heating magnesium citrate. Use of magnesium citrate anhydride as a raw material is preferred because porous carbon with a small mean pore diameter is obtained. The temperature at which magnesium citrate is heated is preferably lower than 1000° C., more preferably 950° C. or lower, and further preferably 900° C. or lower for decreasing the pore diameter and obtaining a pore distribution in the form of a single distribution. The temperature at which magnesium citrate is heated is preferably equal to or higher than a temperature at which magnesium citrate used is carbonized.

The present inventor has given attention to a heat treatment in a composite forming step at the time of forming into a composite a mixture obtained by mixing sulfur with porous carbon satisfying the above-mentioned requirements. The present inventor has found that by carrying out a first step of heating the mixture at a temperature at which sulfur is melted, and a second step of heating the mixture at a temperature at which sulfur is vaporized, in a step of heating the mixture in a closed container, the sulfur utilization rate can be improved, and resultantly a discharge capacity close to a theoretical capacity is obtained. The sulfur utilization rate is calculated as a ratio of a discharge capacity to a theoretical capacity, and indicates a ratio of sulfur, which contributes to an electrode reaction, to sulfur in an electrode.

This may be accounted for by the following mechanism.

(1) The surface of porous carbon is uniformly coated with sulfur in the first step.

(2) Sulfur uniformly carried on the carbon surface in the first step can be vaporized in the vicinity of pores of carbon in the second step.

It is thought that the above action suitably occurs, and thus sulfur particles are highly dispersively carried not only on the surface of porous carbon but also in pores, so that the sulfur utilization rate is improved to obtain a discharge capacity close to a theoretical capacity.

Since the melting temperature and the vaporization temperature of sulfur are 112 to 159° C. and 250° C. or higher, respectively, it is preferred that the mixture be heated from room temperature to a temperature in the range of 112 to 159° C., and then held the temperature in this range in the first step, and the mixtures be heated to 250° C. or higher, and held. The temperature rise rate in each of the first step and the second step is not limited, but it is preferably 1 to 5° C./minute from the viewpoint of work efficiency.

The purpose of heating the mixture for 5 hours or more at a temperature at which sulfur is melted in the first step is to uniformly carry sulfur on the carbon surface. A step of naturally cooling the mixture to 95° C. or lower for accelerating fixation of sulfur applied to the carbon surface may be provided between the first step and the second step.

The present inventor has found that a high sulfur utilization rate similar to that described above can also be achieved by raising the temperature at a moderate rate to a temperature at which sulfur is vaporized in the step of heating the mixture in the closed container.

It is thought that the temperature moderately rises to a temperature at which sulfur is melted, sulfur is thus uniformly carried on the carbon surface, the temperature then moderately rises to a temperature at which sulfur is vaporized, and therefore carbon is uniformly and sufficiently vaporized in the vicinity of pores to highly disperse sulfur not only on the carbon surface but also in the pores, so that the sulfur utilization rate is improved as in the case described above.

The temperature rise rate at which sulfur is uniformly carried is preferably 0.5° C./minute or less, and preferably 0.1 to 0.5° C./minute in view of work efficiency.

The present inventor has analyzed a sulfur-carbon composite prepared in the heat treatment step, and resultantly found that when a mass loss ratio X at 500° C. in thermal mass analysis and a mass ratio Y of sulfur/(sulfur+carbon) in an observation visual field at a magnification of 1000 in SEM-EDS quantitative analysis satisfy the relationship of |X/Y−1|≤0.12, i.e., the ratio of X/Y is within the range of 1±0.12, a positive electrode material for lithium secondary batteries, which has a high sulfur utilization rate, is obtained.

Figure 6:
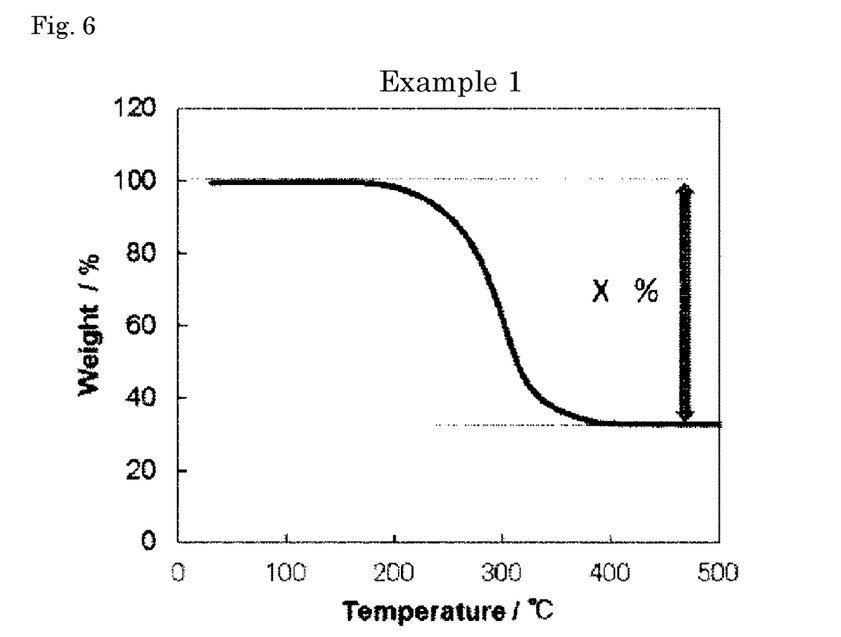
FIG. 6 is a graphic chart showing thermal mass analysis of the sulfur-carbon composite according to the embodiment of the present invention.
Figure 7:
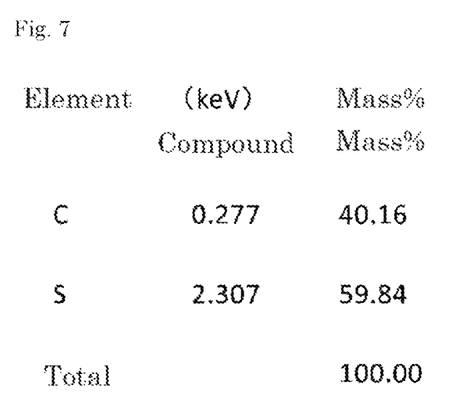
FIG. 7 is a table showing EDS quantitative analysis of a sulfur-carbon composite of Example 1 according to the embodiment of the present invention.

The mass loss ratio X at 500° C. in thermal mass analysis as shown in FIG. 6 corresponds to the content of sulfur in the sulfur-carbon composite. The mass ratio Y of sulfur (S)/(sulfur (S)+carbon (C)) in SEM-EDS quantitative analysis as shown in FIG. 7 corresponds to the content of sulfur existing in the vicinity of the surface of the sulfur-carbon composite. Therefore, the above-mentioned formula shows that the sulfur content of the whole composite is almost equal to the sulfur content in the vicinity of the composite surface, i.e., sulfur is highly dispersed in carbon pores to the same degree as is in the vicinity of the carbon surface of the composite. The sulfur-carbon composite subjected to a heat treatment to achieve such a high dispersion state provides an electrode material having a high sulfur utilization rate.

This may be because sulfur having high resistance is highly dispersed in porous carbon as an electric conductor, and thus a sufficient sulfur/carbon interface for movement of electrons is formed to sufficiently secure an electrically conductive path to sulfur, so that a capacity closer to a theoretical capacity can be achieved.

An electrically conductive material, a binder, a thickener, a filler and so on are added to the electrode material as necessary, the mixture is mixed with a solvent to be formed into a slurry, and the slurry is applied to a current collector to prepare an electrode for nonaqueous electrolyte batteries.

As the binder in the electrode, polyethyleneimine (PEI), polyvinylidene fluoride (PVdF), polytetrafluoroethylene (PTFE), styrene-butylene rubber (SBR), polyacrylonitrile (PAN), polyacrylic acid (PAA) or the like can be used. In particular, use of polyethyleneimine (PEI) is preferred because a high sulfur utilization rate is obtained in an electrode containing the sulfur-carbon composite of the present invention. It is thought that use of polyethyleneimine with water as a dispersion medium improves dispersibility of the sulfur-carbon composite in the slurry applied to the electrode, resulting in improvement of the sulfur utilization rate.

An electrode containing the electrode material is set as a positive electrode, and combined a negative electrode containing lithium, whereby a lithium secondary battery is prepared.

For the negative electrode containing lithium, a lithium metal, a lithium alloy or a lithium-inserted material can be used.

As an example of a lithium salt to be added to a nonaqueous solvent in the nonaqueous electrolyte, a lithium salt that is generally used as an electrolyte in a conventional nonaqueous electrolyte secondary battery can be used. For example, at least one selected from $LiBF_4$, $LiPF_6$, $LiCF_3SO_3$, $LiC_4F_9SO_3$, $LiN(F_2SO_2)_2$, $LiN(CF_3SO_2)_2$, $LiN(C_2F_5SO_2)_2$. $LiAsF_6$ and difluoro(oxalato)lithium borate may be used, or two or more thereof may be used in combination. In particular, it is preferred to use $LiN(F_2SO_2)_2$ or $LiN(CF_3SO_2)_2$ in combination with an electrode containing sulfur.

Examples of the solvent in the nonaqueous electrolyte include cyclic carbonic acid esters, chain carbonic acid esters, esters, cyclic ethers, chain ethers, nitriles and amides which are normally used as nonaqueous solvents for batteries, and at least one selected from these solvents can be used.

Examples of the cyclic carbonic acid ester include ethylene carbonate, propylene carbonate and butylene carbonate, and also include trifluoropropylene carbonate and fluoroethylene carbonate in which some or all of hydrogen groups in the above-mentioned carbonate are fluorinated.

Examples of the chain carbonic acid ester include dimethyl carbonate, ethylmethyl carbonate, diethyl carbonate, methylpropyl carbonate, ethylpropyl carbonate and methylisopropyl carbonate, and also include carbonates in which some or all of hydrogen groups in the above-mentioned carbonate are fluorinated.

Examples of the ester include methyl acetate, ethyl acetate, propyl acetate, methyl propionate, ethyl propionate and γ-butyrolactone.

Examples of the cyclic ether include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole and crown ether. In particular, it is preferred to use 1,3-dioxolane in combination with an electrode containing sulfur.

Examples of the chain ether include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether. In particular, it is preferred to use 1,2-dimethoxyethane or tetraethylene glycol dimethyl ether in combination with an electrode containing sulfur.

Examples of the nitrile include acetonitrile, and examples of the amide include dimethylformamide.

The nonaqueous electrolyte may be a solid system using a polymer electrolyte such as polyethylene oxide. A gel-like electrolyte with a nonaqueous electrolyte solution held in a polymer may be used, or an inorganic compound electrolyte may be used.

As a separator, porous membranes and nonwoven fabrics exhibiting high rate discharge performance may be used alone or in combination, and examples of the material of the separator may include polyolefin-based resins represented by polyethylene, polypropylene and the like, polyester-based resins represented by polyethylene terephthalate, polybutylene terephthalate and the like, polyvinylidene fluoride, vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-tetrafluoroethylene-hexafluoropropylene copolymers and vinylidene fluoride-ethylene-tetrafluoroethylene copolymers.

Figure 8:
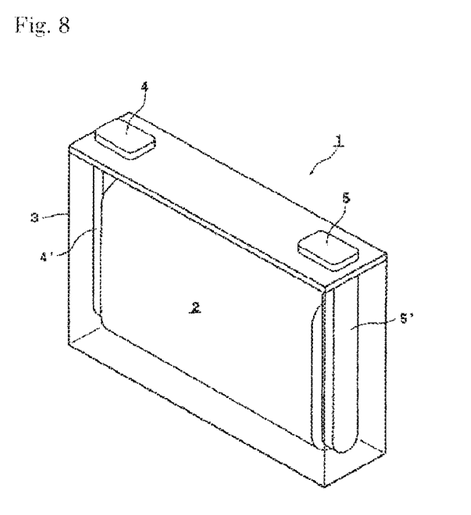
FIG. 8 is a perspective view of a nonaqueous electrolyte battery according to the embodiment of the present invention.

The shape of the nonaqueous electrolyte battery according to the embodiment of the present invention is not particularly limited, and examples of the battery include cylindrical batteries, prismatic batteries (rectangular batteries) and flat batteries. FIG. 8 is a perspective view of the seen-through inside of a container where the nonaqueous electrolyte battery according to the present invention is rectangular. A nonaqueous electrolyte battery 1 shown in FIG. 8 includes a battery container 3, and an electrode group 2 stored therein. The electrode group 2 is formed by winding a positive electrode and a negative electrode with a separator interposed therebetween, the positive electrode including a positive active material, and the negative electrode including a negative active material. The positive electrode is electrically connected to a positive electrode terminal 4 through a positive electrode lead 4', and the negative electrode is electrically connected to a negative electrode terminal 5 through a negative electrode lead 5'.

Figure 9:
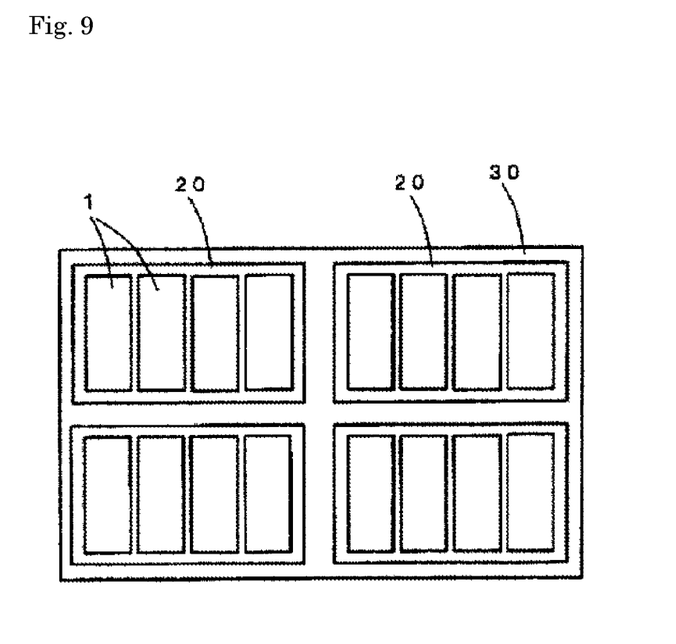
FIG. 9 is a schematic view of an energy storage apparatus according to the embodiment of the present invention.

The embodiment of the present invention can also be implemented as an energy storage apparatus in which a plurality of nonaqueous electrolyte batteries as described above are assembled. One embodiment of the energy storage apparatus is shown in FIG. 9. In FIG. 9, an energy storage apparatus 30 includes a plurality of energy storage units 20. Each energy storage unit 20 includes a plurality of nonaqueous electrolyte batteries 1. The energy storage apparatus 30 can be mounted as an automobile power source for an electric vehicle (EV), a hybrid electric vehicle (HEV), a plug-in hybrid electric vehicle (PHEV) or the like.

EXAMPLES

Specific examples and comparative examples will be shown below, but the present invention is not limited to the examples below as long as claims are satisfied.

(Preparation of Porous Carbon)

Trimagnesium dicitrate anhydride (manufactured by KOMATSUYA CORPORATION) was heated at a temperature rise rate of 5° C./minute, held under a nitrogen atmosphere at 900° C. for 1 hour to be carbonized, then immersed a 1M aqueous $H_2SO_4$ solution to extract MgO, and washed and dried to obtain porous carbon. The pore diameter distribution of the porous carbon was measured by a nitrogen gas adsorption method under the following conditions.

Measurement apparatus: high-performance full-automatic gas adsorption amount measurement apparatus AUTOSORB-1-MP-9 (manufactured by Quantachrome Instruments)

Degassing condition: sample was degassed at room temperature (under vacuum) for 12 hours or more.

Cell size: 1.8 cc (stem outer shape: 6 mm)

Adsorption gas: nitrogen gas

Measurement items: adsorption at arbitrary measurement point/desorption isotherm Analysis items: specific surface area, total pore volume and mean pore diameter by BET multipoint method pore diameter distribution (mesopore region) by BJH method pore diameter distribution (micropore to mesopore region) by DFT method The mean pore diameter was calculated from the values of the total pore volume and the specific surface area on the assumption that the pore structure had a cylindrical shape. The total pore volume was calculated from the adsorption gas amount of P/P0 (relative pressure)=0.99 on the assumption that pores were filled with liquid nitrogen.

Figure 1:
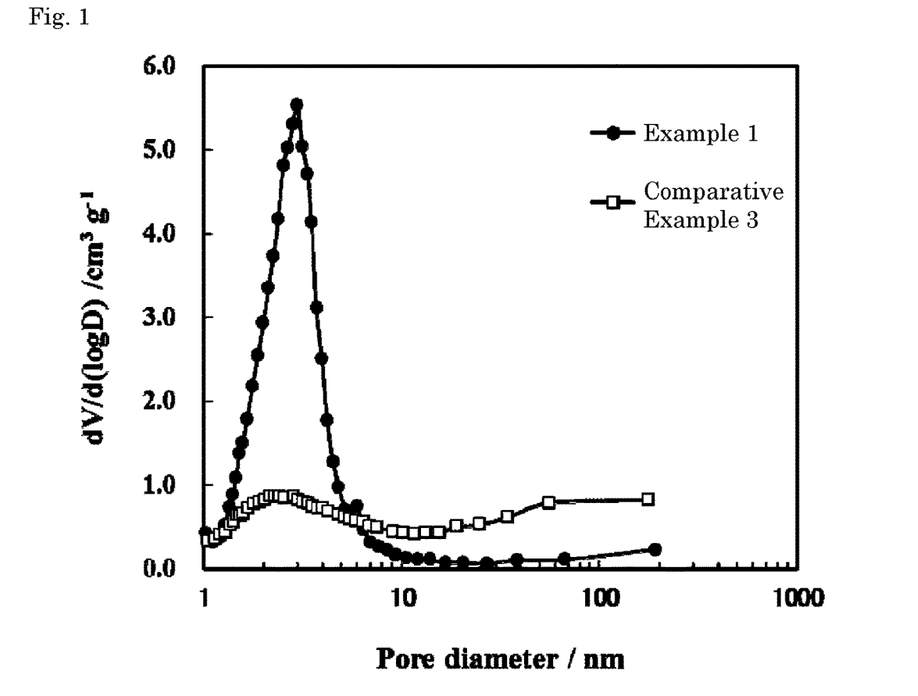
FIG. 1 is a graphic chart showing a log pore volume distribution for each of porous carbon according to an example and ketjen black according to Comparative Example 3 in an embodiment of the present invention.

The results showed that the porous carbon had a mean pore diameter of 3 nm, a pore volume of 2 $cm^3g^{-1}$ and a specific surface area of 2500 $m^2g^{-1}$. The results of measuring the log pore volume distribution are shown in FIG. 1.

The peak half-value width in the log differential pore volume distribution was 1.8 nm.

(Heating Step of Mixture)

Example 1

The sulfur and porous carbon prepared in the above-mentioned step were mixed at a mass ratio of 70:30.

Figure 2:
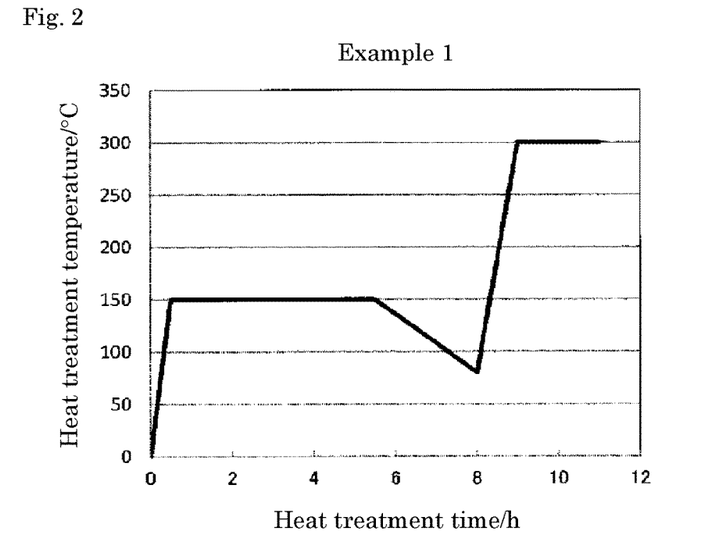
FIG. 2 is a graphic chart showing a step of heat-treating a sulfur-carbon composite according to the example in the embodiment of the present invention.

The resulting mixture was enclosed in a closed container under an argon atmosphere, and subjected to a heat treatment in which as shown in FIG. 2, the mixture was heated to 150° C. at a temperature rise rate of 5° C./minute, held for 5 hours, and then naturally cooled to 80° C. as a temperature at which sulfur is solidified, and thereafter the mixture was heated again to 300° C. at a temperature rise rate of 5° C./minute, and held for 2 hours.

Example 2

Figure 3:
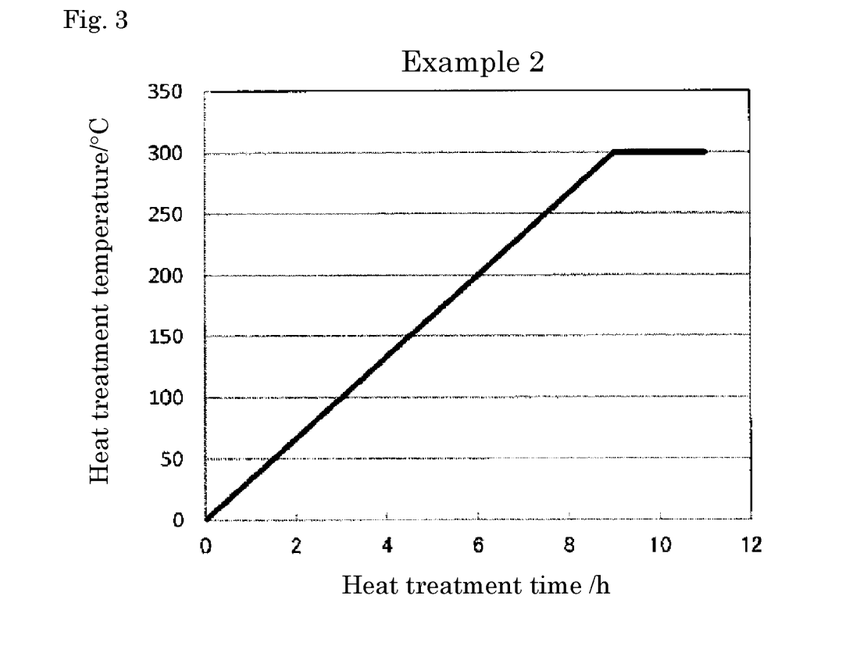
FIG. 3 is a graphic chart showing a step of heat-treating a sulfur-carbon composite according to another example in the embodiment of the present invention.

The same mixture as in Example 1 was enclosed in a closed container under an argon atmosphere, and subjected to a heat treatment in which as shown in FIG. 3, the mixture was heated to 300° C. at a temperature rise rate of 0.5° C./minute, and kept at 300° C. for 2 hours.

Comparative Example 1

Figure 4:
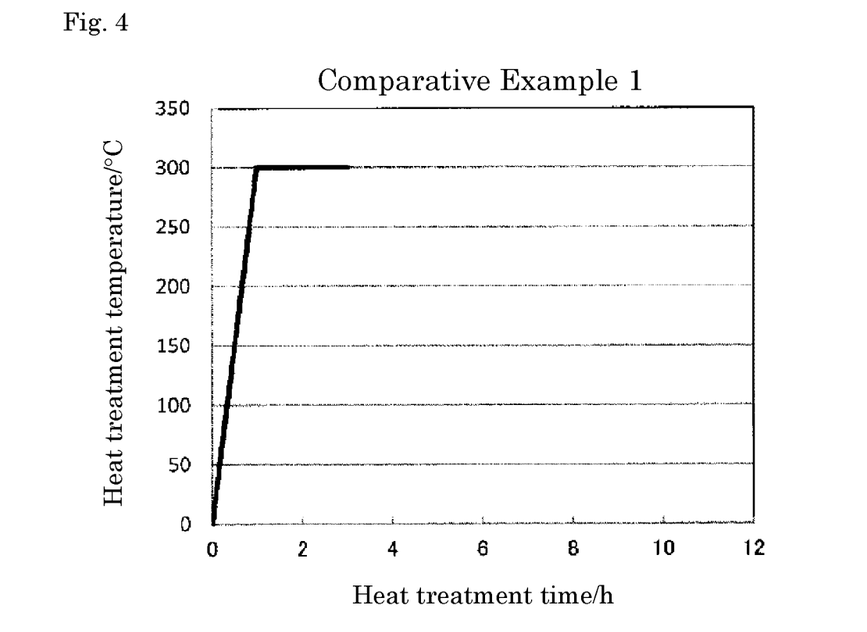
FIG. 4 is a graphic chart showing a step of heat-treating a sulfur-carbon composite according to a comparative example in the embodiment of the present invention.

The same mixture as in Example 1 was enclosed in a closed container under an argon atmosphere, and subjected to a heat treatment in which as shown in FIG. 4, the mixture was heated to 300° C. at a temperature rise rate of 5° C./minute, and held for 2 hours.

Comparative Example 2

Figure 5:
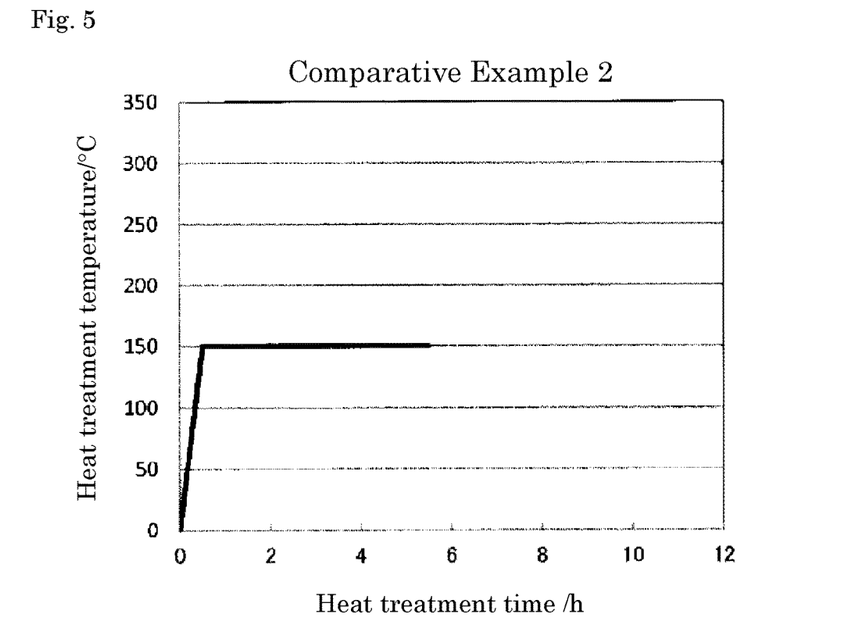
FIG. 5 is a graphic chart showing a step of heat-treating a sulfur-carbon composite according to another comparative example in the embodiment of the present invention.

The same mixture as in Example 1 was enclosed in a closed container under an argon atmosphere, and subjected to a heat treatment in which as shown in FIG. 5, the mixture was heated to 150° C. at a temperature rise rate of 5° C./minute, and held for 5 hours.

Comparative Example 3

A mixture obtained by mixing sulfur with ketjen black with a mean pore diameter of 7 nm and a specific surface area of 1000 $m^2g^{-1}$ at a mass ratio of 70:30 was enclosed in a closed container under an argon atmosphere, and subjected to the same heat treatment as that in Example 1 shown in FIG. 2.

(Measurement of Sulfur Content by Thermal Mass Analysis)

The mixture subjected to the heat treatment in each of the examples and comparative examples was subjected to thermal mass analysis under the following conditions. The results showed that as shown in FIG. 6, a mass loss occurred over a temperature range from 200° C. to a temperature exceeding 300° C., and there was no mass change over a temperature range from a temperature just before 400° C. to 500° C. Since sulfur starts vaporizing at a temperature exceeding 200° C., and stops vaporizing at 400° C., the mass loss ratio at 500° C. in thermal mass analysis corresponds to the sulfur mass ratio in the whole composite.

(Thermal Mass Analysis Conditions)
Temperature rise rate: 10° C./minute
Atmosphere: helium
Mass of sample: 10 mg (Measurement of Sulfur Content by SEM-EDS Quantitative Analysis)

SEM-EDS quantitative analysis was performed under the following conditions.
SEM: scanning electron microscope JSM-6060LA (manufactured by JEOL Ltd.)
EDS: energy dispersive X-ray analyzer EX-23000BU (manufactured by JEOL Ltd.)
Detector: mini-cup-type EDS detector EX-54175 JMU (manufactured by JEOL Ltd.)
Accelerated voltage: 15 kV
Spot size: 60
WD (sample-to-sample distance): 10 mm The results of Example 1 in an observation visual field at a magnification of 1000 in SEM-EDS quantitative analysis are shown in FIG. 7. Since SEM-EDS quantitative analysis reveals a surface state of a sample, the mass ratio Y (S/(S+C)) of sulfur/(sulfur+carbon) corresponds to the sulfur mass ratio in the vicinity of the composite surface.

Preparation of Batteries of Examples 1 and 2 and Comparative Examples 1 to 3

A slurry containing the sulfur-carbon composite obtained in each of Examples 1 and 2 and Comparative Examples 1 to 3, acetylene black as a conductive material and polyvinylidene fluoride (PVdF) as a binder at a mass ratio of 85:5:10 was applied to a current collector using N-methylpyrrolidone (NMP) as a dispersion medium, and dried to prepare an electrode. A battery including the prepared electrode as a working electrode, metallic Li as a counter electrode, and a nonaqueous electrolyte solution composed of tetraethylene glycol dimethyl ether (TEGDME) as a solvent and 1 M lithiumbis(trifluoromethanesulfonyl)imide (LiTFSI) dissolved therein was prepared.

Preparation of Battery of Example 3

Except that water was used as a dispersion medium, the sulfur-carbon composite obtained in Example 1 was used, and polyethyleneimine (PEI) was used as a binder, the same procedure as described above was carried out to prepare a battery.

(Charge-Discharge Test)
A charge-discharge test for the prepared battery was conducted under the following conditions.
Discharge (lithiation) constant current discharge at a current of 0.1 CA and a termination voltage of 1.0 V
Charge (delithiation) constant current charge at a current of 0.1 CA and a termination voltage of 3.0 V; restricted to 10 hours if the voltage does not reach the termination voltage (1 CA is based on the theoretical capacity of sulfur (S): 1675 mAhg$^{-1}$)

The results of examples and comparative examples are shown in Table 1 below.

TABLE 1

| | Carbon in composite | Heat treatment conditions | Temperature rise rate | Sulfur content Thermal mass analysis X (%) | EDS Y (%) | Discharge capacity (mAh/g) | Utilization rate (%) | X/Y | \|X/Y − 1\| |
|---|---|---|---|---|---|---|---|---|---|
| Example 1 | Porous carbon | 150° C. and 300° C. | 5° C./min | 67.0 | 59.8 | 743 | 67 | 1.12 | 0.12 |
| Example 2 | Porous carbon | 300° C. | 0.5° C./min | 67.7 | 70.4 | 879 | 71 | 0.96 | 0.04 |
| Example 3* | Porous carbon | 150° C. and 300° C. | 5° C./min | 67.0 | 59.8 | 930 | 83 | 1.12 | 0.12 |
| Comparative Example 1 | Porous carbon | 300° C. | 5° C./min | 68.2 | 82.6 | 696 | 60 | 0.83 | 0.17 |
| Comparative Example 2 | Porous carbon | 150° C. | 5° C./min | 69.8 | 81.5 | 590 | 50 | 0.86 | 0.14 |
| Comparative Example 3 | Ketjen black | 150° C. and 300° C. | 5° C./min | 70.0 | 81.6 | 515 | 44 | 0.86 | 0.14 |

*Binder is PEI

The above results show that the sulfur-carbon composites of Examples 1 and 2 in which X and Y satisfy the relationship of $|X/Y-1| \leq 0.12$, and the value of X/Y is close to 1 has a larger discharge capacity and a higher sulfur utilization rate as compared to the sulfur-carbon composites of Comparative Examples 1 and 2 in which the value of $|X/Y-1|$ is larger than 0.12.

It is apparent that for highly dispersing sulfur in porous carbon, sulfur may also be dispersed in pores of the porous carbon by heating and holding the mixture of sulfur and porous carbon for 5 hours or more at a temperature at which sulfur is melted, and then heating the mixture again to a temperature at which sulfur is vaporized as in Example 1. It is preferred that sulfur be naturally cooled on a temporary basis from the melting temperature to a temperature at which sulfur exists in a solid state, so that fixation of the sulfur applied to the surface is accelerated.

Sulfur carried on the surface may be uniformly vaporized to disperse the sulfur in carbon pores by heating the mixture of sulfur and porous carbon to the vaporization temperature of sulfur at a moderate temperature rise rate as in Example 2.

Example 3 provides a battery including an electrode obtained using polyethyleneimine as a binder in the sulfur-carbon composite obtained in Example 1. This battery exhibited a higher discharge capacity as compared to a battery including an electrode obtained using polyvinylidene fluoride.

The sulfur-carbon composite obtained by performing a heat treatment in which the temperature was raised to the vaporization temperature of sulfur at a rapid rate as in Comparative Example 1 had a low sulfur utilization rate. This may be because sulfur does not sufficiently move into pores of the porous carbon, and therefore the contact area between the sulfur and the porous carbon is small.

The sulfur-carbon composite subjected to the heat treatment step in Comparative Example 2 had a low sulfur utilization rate. This may be because the vaporization step of raising the temperature to the vaporization temperature is not carried out, and therefore sulfur applied to the surface hardly moves into pores.

For preparation of the active material of Comparative Example 3, porous carbon was not used. The active material was prepared in the following manner: a mixture of sulfur and ketjen black having a mean pore diameter of 7 nm, a specific surface area of 1000 $m^2g^{-1}$ and a log differential pore volume distribution as shown in FIG. 1 was heat-treated under the same conditions as in Example 1. Sulfur is distributed only on the surface of carbon. and therefore the sulfur utilization rate is low.

The above results show that an electrode material having a high sulfur utilization rate and a discharge capacity closer to a theoretical capacity can be obtained from a sulfur-carbon composite having a sulfur distribution which satisfies the relationship of $|X/Y-1|\leq 0.12$.

When two heat treatment steps of raising the temperature to a melting temperature and a vaporization temperature are carried out, or a heat treatment is performed to a vaporization temperature at a temperature rise rate of 0.5° C./minute or less, an electrode material having a high sulfur utilization rate and a discharge capacity closer to a theoretical capacity can be obtained.

DESCRIPTION OF REFERENCE SIGNS

1 Nonaqueous electrolyte battery
2 Electrode group
3 Battery container
4 Positive electrode terminal
4' Positive electrode lead
5 Negative electrode terminal
5' Negative electrode lead
20 Energy storage unit
30 Energy storage apparatus

INDUSTRIAL APPLICABILITY

A sulfur-carbon composite having a high capacity and a high sulfur utilization rate is obtained, and by using the composite in an electrode, a nonaqueous electrolyte battery and an energy storage apparatus which are suitable for high capacity applications can be provided.

The invention claimed is:

1. A sulfur-carbon composite in which sulfur is carried on porous carbon, wherein a mass loss ratio X of the sulfur-carbon composite, in thermal mass analysis of the sulfur-carbon composite, over a temperature range from room temperature to 500° C. with respect to a mass of the sulfur-carbon composite at room temperature and a mass ratio Y of sulfur/(sulfur +carbon) in an observation visual field at a magnification of 1000 in SEM-EDS quantitative analysis of the sulfur-carbon composite satisfy the relationship of:

$|X/Y-1|\leq 0.12$.

the porous carbon has a mean pore diameter of 1 to 6 nm, and the porous carbon has a specific surface area of 2000 $m^2g^{-1}$ or more and 3000 $m^2g^{-1}$ or less.

2. The sulfur-carbon composite according to claim 1, wherein the content of sulfur in the sulfur-carbon composite is 50% by mass or more.

3. An electrode comprising the sulfur-carbon composite according to claim 1.

4. The electrode according to claim 3, further comprising polyethyleneimine.

5. A nonaqueous electrolyte battery comprising the electrode according to claim 3.

6. A method for producing a sulfur-carbon composite, the method comprising a step of heating, in a closed container, a mixture obtained by mixing sulfur with porous carbon having a specific surface area of 2000 $m^2g^{-1}$ or more and 3000 $m^2g^{-1}$ or less, and a peak half-value width of 1.0 nm to 2.5 nm in a log pore volume distribution to form a sulfur-carbon composite, the heating step including:
a first step of heating the mixture for 5 hours or more at a temperature at which sulfur is melted; and
a second step of heating the mixture at a temperature at which sulfur is vaporized, after the first step,
wherein the porous carbon has a mean pore diameter of 1 to 6 nm.

7. A method for producing a sulfur-carbon composite, the method comprising a step of heating, in a closed container, a mixture obtained by mixing sulfur with porous carbon having a specific surface area of 2000 $m^2g^{-1}$ or more and 3000 $m^2g^{-1}$ or less, and a peak half-value width of 1.0 nm to 2.5 nm in a log differential pore volume distribution to form a sulfur-carbon composite,
the heating step including heating the mixture at a temperature rise rate of 0.5° C./minute or less to a temperature at which sulfur is melted, and to a temperature at which sulfur is vaporized,
wherein the porous carbon has a mean pore diameter of 1 to 6 nm.

8. The method according to claim 6, further comprising, prior to the step of heating, generating carbon-coated MgO, and extracting MgO from the carbon-coated MgO to obtain the porous carbon.

9. The method according to claim 7, further comprising, prior to the step of heating, generating carbon-coated MgO, and extracting MgO from the carbon-coated MgO to obtain the porous carbon.

* * * * *